United States Patent [19]

Herring

[11] Patent Number: 6,011,806
[45] Date of Patent: Jan. 4, 2000

[54] CELLULAR TELEPHONE COMMUNICATION PROTOCOL

[75] Inventor: Russell M. Herring, San Antonio, Tex.

[73] Assignee: ATX Research, Inc., San Antonio, Tex.

[21] Appl. No.: 08/965,438

[22] Filed: Nov. 6, 1997

Related U.S. Application Data

[60] Provisional application No. 60/029,721, Nov. 8, 1996.

[51] Int. Cl.[7] .................................................... H04Q 7/00
[52] U.S. Cl. ............................................ 370/494; 375/217
[58] Field of Search .................................... 370/252, 276, 370/277, 278, 281, 295, 492, 493, 494, 495, 496, 329, 330, 343; 455/456, 194.1; 375/272, 303, 216, 217; 340/825.06

[56] References Cited

U.S. PATENT DOCUMENTS

| | | |
|---|---|---|
| 4,430,742 | 2/1984 | Milleker et al. ............................ 375/5 |
| 4,517,561 | 5/1985 | Burke et al. ........................ 340/825.07 |
| 4,591,851 | 5/1986 | Noble et al. ........................ 340/825.07 |
| 4,663,765 | 5/1987 | Sutphin et al. ............................. 375/5 |
| 5,046,082 | 9/1991 | Zicker et al. ............................. 379/59 |
| 5,282,204 | 1/1994 | Shpancer et al. ....................... 370/341 |
| 5,548,802 | 8/1996 | Barnes et al. ............................. 455/15 |
| 5,613,196 | 3/1997 | Barnes et al. ............................. 455/15 |

*Primary Examiner*—Chi H. Pham
*Assistant Examiner*—Ricky Ngo
*Attorney, Agent, or Firm*—Jenkens & Gilchrist, P.C.

[57] ABSTRACT

A cellular telephone communication protocol enables a communication link primarily for the transmission of voice and data. At predetermined intervals or on-demand data regarding location, an event, or a condition is sent by muting the voice audio and sending a data frame having a predetermined sequence. Following the transmission of the location, event, or condition data transmission of voice and data is resumed. The communication link uses a half duplex, frequency shift, keying modulation technique.

41 Claims, 3 Drawing Sheets

Data Exchange Timing

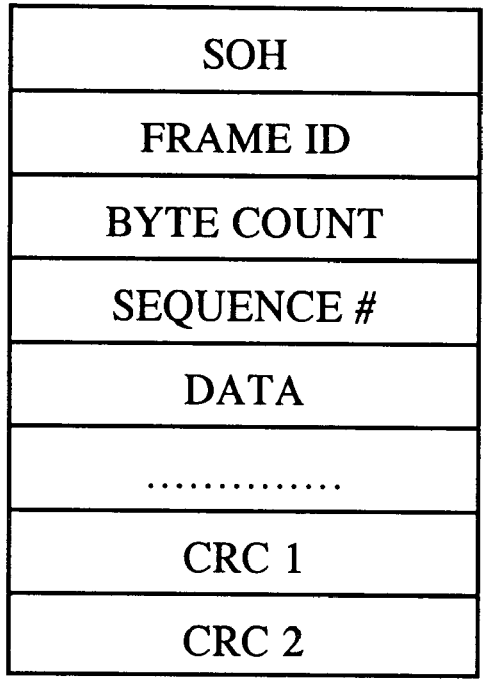
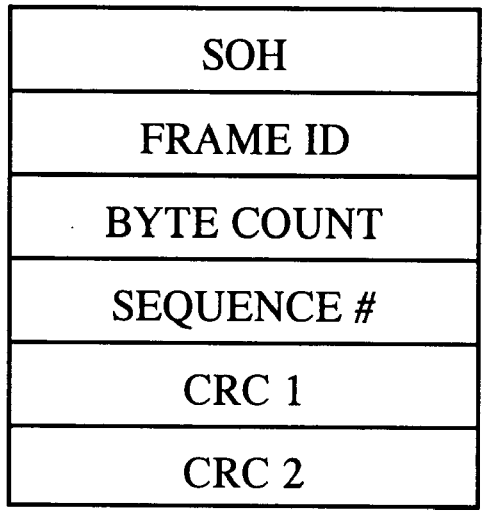
FIG. 1

| FRAME ID | FRAME FUNCTION | CODE |
|---|---|---|
| Data Frames: | | |
| Location Data Frame | Transfer location data from the vehicle to the base station | 0 |
| Supervisory Frames: | | |
| Acknowledgment (ADK) | Acknowledges receipt of the frame identified by the Sequence # | 1 |
| Commands: | | |
| Hang Up | Go on-hook (terminate call) | 2 |
| High Resolution Data | Go to one second mode | 3 |
| Medium Resolution Data | Go to five second mode | 4 |
| Initiate Security Event | Set Commanded Event mode | 5 |
| Terminate Security Event | Terminate all Security Events | 6 |
| Kill Ignition | Turn off the vehicle ignition | 7 |
| Restore Ignition | Turn on the vehicle ignition | 8 |
| Honk Horn/Unlock doors | honk the vehicle honk and unlock the doors (1 sec pulse) | 9 |
| Total Disable | Disable all calls from the vehicle | 10 |
| Send Single Frame | Send a single frame, (greeting, Invitation to Transmit) | 11 |
| Reset Password | Reset password to factory default (890) | 12 |
| Produce Simulated Ring | Generate a 2 second ring sound in speaker | 13 |
| Send Short Location frames | Enable short GPS/status frame mode | 14 |
| Mute Audio | Mute audio to the speaker | 15 |
| Send Long Location frames | Enable long (default) GPS/status frame mode | 16 |
| Activate Aux Out | Pulse on (1 sec) the auxiliary output | 17 |
| Enable RD | Enable the handset keypad | 18 |
| Vol Up | Send the volume up command to the cell Transceiver | 19 |
| Vol Down | Send the Volume down command to the cell Transceiver | 20 |
| Begin Downloading Location History Log | Tell Tracker to begin sending recorded location data instead of real time data | 21 |
| Set Options | Set the requested options in the second byte (multibyte command) | 129 |
| Clear Options | Clear the requested options in the second byte (multibyte command) | 130 |
| Specify Data Logging Interval | Set the new data logging time interval | 131 |

*FIG. 2*

CELLULAR TELEPHONE COMMUNICATION PROTOCOL

CROSS-REFERENCE TO RELATED APPLICATIONS

This application claims priority from U.S. Provisional Application 60/029,721 filed on Nov. 8, 1996.

FIELD OF THE INVENTION

The present invention pertains to cellular telephone communication systems; more particularly, the present invention pertains to a communication method protocol for a voice/data communication link between a vehicle and a remotely located response center or monitoring station.

BACKGROUND OF THE INVENTION

With the rapid explosion in the use of cellular telephone communications systems in the United States, it is not uncommon to find vehicles equipped with a cellular telephone communication system. Such vehicle mounted cellular telephone communication systems are not only used for voice communication between the driver of the vehicle and a remote monitoring system but are also used to provide data describing the location of the vehicle, data concerning events occurring at the vehicle and data describing the condition of the vehicle—to the remote monitoring station. Such data may include the latitude and longitude of the vehicle, the condition or state of any of the numerous operating systems which are resident on a motor vehicle, and the occurrence of an event such as theft of the vehicle, a vehicle fire, an accident or an alarm condition, such as a medical emergency, sensed by the driver.

When a cellular telephone communication system is used to provide the location of the vehicle such location is normally provided by using the signals transmitted by one or more orbiting satellites. Such orbiting satellites are part of the Global Positioning System (GPS). The signals received by the vehicle from the orbiting GPS satellites are translated by a tracking module mounted in the vehicle. The tracking module converts signals received from one or more orbiting GPS satellites into latitude and longitude data. In addition to the transmission of location data, there is also a critical need to assure that voice communication between an operator at the remote monitoring station and the occupants of the vehicle is not overly hampered by the transmission of data.

Therefore, the design criteria for a cellular communication system between a vehicle and a remote monitoring station should include:

Easily understandable voice conversation with minimal interruption by the transmission of data;

Assurance of data integrity;

Determination of loss of the communication link;

User-friendly, reliable operation;

Ability to function in high noise environments having multiple communication link impairments;

Recognition of repeated commands in either direction.

BRIEF SUMMARY OF THE INVENTION

The data transmission communication method protocol of the present system relies on a half duplex, frequency shift keying modulation technique. When an information-bearing data burst is to be sent from the tracking module on board the vehicle, the voice communication is first muted. The voice communication which originates in the vehicle is either from the hands free microphone or the handset microphone portion of the cellular telephone communication system.

When it is desired to send information-bearing data over the communication link, such as when an event occurs in a vehicle warranting rapid communication between the vehicle and the remote response center, the system on board the vehicle initiates a call. When the remote response center detects an incoming call from a vehicle mounted communication system it answers the call and sends a greeting message data burst back to the tracking module in the vehicle. This message is an invitation to the tracking module on the vehicle to begin transmitting data, for example, location and vehicle status data. The tracking module in the vehicle responds with an acknowledgment message which signals that it will now begin to send packets of data to the remote response center.

The information-bearing data packet that is sent from the vehicle between the extended periods of voice communication begins with a Start of Header byte. The Start of Header byte is followed by a Frame Type byte which in turn is followed by a Byte Count and Sequence Number byte. Following the Byte Count and Sequence Number byte are one or more Data Fields which are used to transmit either the vehicle position location information or other event/condition information from the vehicle. The end of the Data Packet is signaled by the transmission of two Cyclic Redundancy Check (CRC) Error Detection bytes. Since information-bearing data packets can occur at random time intervals during a communication link, the receiver does not know when to expect an information-bearing data packet. Therefore, the receiver is continually looking for the receipt of an information-bearing data packet. Since voice communication is demodulated into data, the receiver is constantly receiving a stream of non-information-bearing data generated by the voice transmission. Such non-information-bearing data, based on voice transmission, is meaningless. However, as soon as the receiver senses that it has received a valid Start of Header byte, a Frame Type byte and Byte Count it automatically mutes the voice being transmitted to the cellular telephone. This prevents subsequent voice transmission from corrupting the remainder of the information-bearing data stream which follows.

Once the stream of information-bearing data containing location information or event/condition information has been received, its validity must be checked. If it is a good message containing location or event/condition information, then an Acknowledgment (ACK) message is assembled. The Acknowledgment (ACK) message also has the same type of Cyclic Redundancy Check and Sequence byte corruption protection. Once the information-bearing data burst/Acknowledgment (ACK) message exchange has been completed, the muting of the voice mode transmission is turned off at both ends of the communication link and two-way voice communication is resumed. If the error detection sequence of the transmission indicates that the information-bearing data packet transmission has been corrupted, then the transmitted information-bearing data packet is ignored and the muting of voice transmission is turned off. Negative Acknowledgment (NAK) are never transmitted in response to corrupted data.

The foregoing communication protocol is a master/slave type protocol. Ordinarily the tracking module mounted on the vehicle initiates the communication link. The remote response center accepts the location or event/condition information data from the tracking module on the vehicle and then acknowledges the message. This arrangement prevents a collision of data transmission on the communication link. If both ends of the communications link transmitted data simultaneously, no data would get through. Therefore, if data communication is initiated by the tracking module in the vehicle, transmission collisions do not occur. The most notable exception to this rule is when there is an invitation to transmit data command originating at the remote response center to the tracking module on the vehicle. In this case, the tracking module is normally silent so that no collision of data transmissions occurs.

Another case where the response center initiates a communication transaction is the "(information-bearing) data on demand" method of operation when the tracking module can be put into a 30 second automatic information-bearing data update mode. This information-bearing data update mode is entered because urgent voice communication is needed without any information-bearing data interference. During the 30 second automatic update mode the tracking module is silent; that is no information-bearing data is transmitted. If a position update is needed before the 30 seconds of voice communication elapses, the operator at the response center can initiate a "(information-bearing) data on demand" command. The response center then autonomously sends this "(information-bearing) data on demand" request to the tracking module in the vehicle. The tracking module recognizes this "(information-bearing) data on demand" request and responds by sending an information-bearing data packet to the response center. If the response center receives this information-bearing data update without any corruption of the information-bearing data the response center sends an Acknowledgment message to the tracking module. This reversal of the roles in master and slave usually does not result in any data transmission collision. However, if it does, the Sequence Number byte will prevent confusion from occurring.

The Byte Count tells the receiver how long the message should be and where the Cyclic Redundancy Checks bytes are located. The purpose of the Sequence Number byte is to number the messages. This numbering of the information-bearing data packets is to determine if an information-bearing data packet that has been received . . . is either a new information-bearing data packet or one that has been retransmitted. The packet of position information data is never retransmitted because it is not imperative to assure that this particular position information data packet is received. Because the position information packets occur at regular intervals, there is little change in the updated vehicle location information. Thus, the next scheduled information-bearing data packet will have updated position data instead of old position data. Therefore, unlike a data file transfer, it is not necessary for each and every information-bearing data packet to get through to the remote response center. This tolerance of errors in the link without retransmission is a fundamental departure from standard data communications protocols. This will be explained in more detail later.

If the system is in a mode where position data is transmitted after only one second of voice communication and an error occurs, new position data will be sent one second later. This rationale does not apply to command frames. In this case it is imperative that the information-bearing command frame get through once and only once. By incrementing the Sequence Number byte for each new acknowledged message it can be determined if the currently received message is a new message or a retransmitted message. This is accomplished by comparing the new Sequence Number byte to the last one. If the sequence byte is different, then the message is a new one. If the Sequence Number is the same, then the current received message is merely the previous command retransmitted. This can only happen if the message is received through uncorrupted but the acknowledgment is corrupted. The result of this generally described communication protocol is a fault tolerant communication link in which some errors are tolerated and some are corrected. The selective correction in a fully error protected, block oriented and numbered protocol is widely divergent from standard data communications doctrine.

BRIEF DESCRIPTION OF THE DRAWINGS

FIG. 1 includes two tables illustrating the frame content scheme of a data frame and a supervisory frame;

FIG. 2 is a table showing the function and identifier of various data frames.

DETAILED DESCRIPTION OF THE INVENTION

Figure 3:
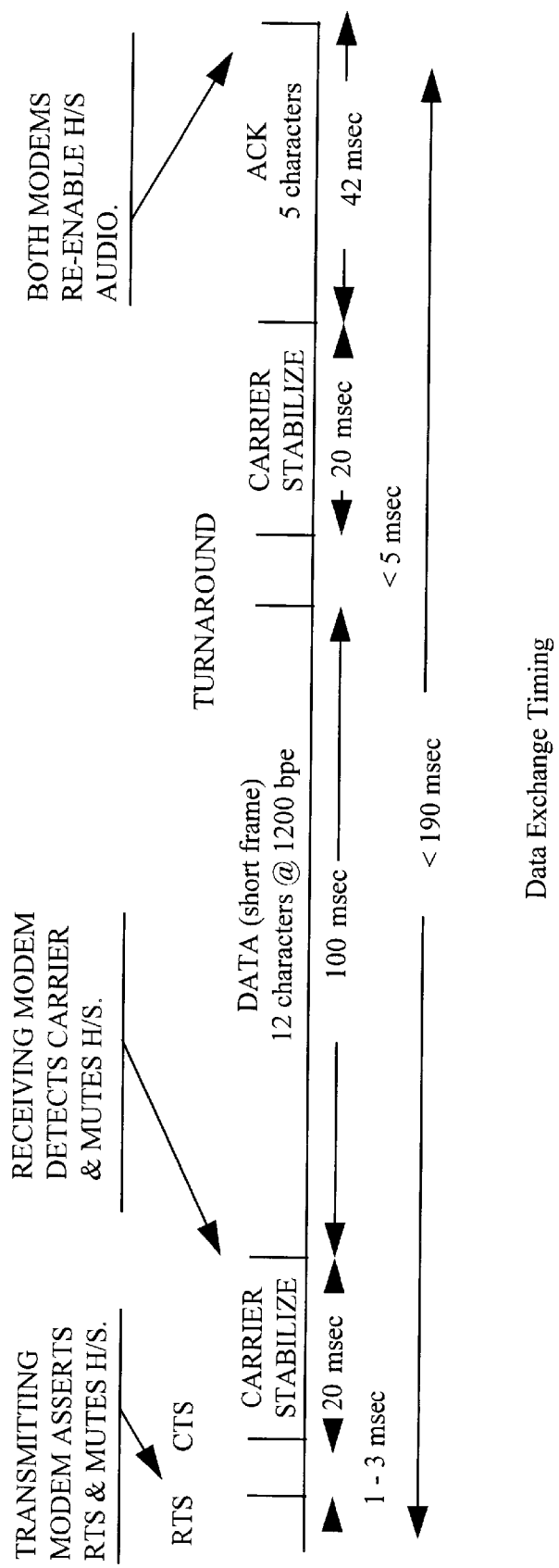
FIG. 3 is a time line showing the sequence of data exchange.

Existing Cellular Telephone and other Wireless Communications Systems

Essential to the operation of the communication protocol of the present invention for the communication link between a vehicle and a remote monitoring station is the requirement that the system transmit primarily voice communication at a level of quality that is easily understandable by both the occupants of the vehicle and the operator at the remote monitoring station. When information-bearing data is to be sent over the communication link, the information-bearing data is sent as a packet referred to as a "frame".

Typically, voice/data communication links use modulation standards such as Bell 212A, CCITT V.22 or V.32. These modulation standards are full duplex or two-way communication schemes. Thus, to effect two-way communication, the carrier must be turned on at each end of the communication link at all times. If the carrier signal happens to be turned off or disappear, then the full duplex communication link is automatically dropped. To avoid the inadvertent dropping of a communication link a half duplex as distinguished from a full duplex or two-way communication scheme was selected for the present invention. This means that normal voice operation is experienced over the link most of the time. When data is to be sent, the voice channel is muted and the data is sent.

It has also been found that many wireless technologies are quite noisy. This means that extracting information-bearing data from a voice signal can be quite difficult. Since at least part of the communication link involves a standard landphone line, the bandwidth characteristics of the phone line are added to those bandwidth characteristics of the wireless link. Thus, to send information-bearing data over an analog communication link requires that the information-bearing data be modulated at the sending location to transmit the information-bearing data and then demodulated at the receiving location to receive the information-bearing data. There are many types of modulations available for data communication. Modulation types include on/off keying (OOK), amplitude modulation (AM), frequency shift keying (FSK), phased shift keying (PSK), differential phase shift keying (DPSK), quadrature amplitude modulation (QAM, and quadrature amplitude modulation with full echo cancellation.

Because of the limitations of wireless communication systems the more complicated modulation schemes do not work very well. It has been found that the simpler the modulation scheme, the better the communication obtained from the wireless medium. Thus, the type of modulation used must be simple yet still permit the satisfactory transmission of information-bearing data.

The on/off keying modulation system is not complicated but the information-bearing data transmission rate in bytes per second is quite low.

Not quite as simple is the amplitude modulation (AM) system. However, the quality of communication in many wireless mediums is degraded because of the large amount of AM noise present. Therefore, a communication link based on amplitude modulation is not satisfactory.

The next simpler modulation system is frequency shift keying. It has been found that using frequency shift keying at 1,200 bytes per second offers a good compromise of speed and reliability. Interestingly, there are no 2,400 bytes per second half duplex communication standards that utilize a frequency shift keying modulation system.

International communication standard V27 at 2400 bytes per second and at 4800 bytes per second are differential phase shift keying modulation systems. Such systems are more complex thus are more difficult to use over wireless communication links. The training time is also very long. This results in less time for voice. However, for large amounts of data, V.27 is a good choice.

International communication standard V29 at 9600 bytes per second utilizes both phase shift keying and amplitude modulation. This is called QAM. However, it is expected that with such high transmission rates a significant information-bearing data error rate can be expected. This standard suffers from the same long training as standard V.27.

Given the operational criteria for the present system a 1200 bytes per second, half duplex, frequency shift keying modulation system is satisfactory. Such system is a special case of the international standard V.23 half duplex, no low speed reverse channel. The utilization of international standard V.23 allows for the transmission of asynchronous information-bearing data with a very little preamble to condition the receiver. Such systems require no line matching or echo canceling.

Voice/Data

Multiple schemes are available to blend voice and information-bearing data together for transmission. The simplest blending system switches from a voice mode to an information-bearing data mode or vice versa upon command. The communication link is then either in voice mode or in information-bearing data mode. This type of communication link prevents the voice mode from corrupting the information-bearing data mode; however, operation of such a communication scheme has proven to be clumsy.

The next simplest communication mode operates primarily in voice mode. Then, only short bursts of information-bearing data are sent when necessary.

A more complicated communication scheme entails digitizing and compressing the voice and then multiplexing it with the information-bearing data. Such a process requires a high rate of information-bearing data transmission to attain a reasonable level of voice quality. This would require a high bandwidth data link. The combined cellular system and the terrestrial phone system do not combine to form a high bandwidth system. Another method would be to modulate the constellation points in a quadrature modulation scheme with voice. This requires a wider bandwidth and low noise to operate effectively. Voice quality suffers in this type of a system.

The simplest and most reliable communication mode is a switched voice/data scheme. Specifically, voice is transmitted in the normal mode. Whenever information-bearing data is to be transmitted, the voice is muted to prevent it from corrupting the information-bearing data. The information-bearing data burst is then sent out. Specifically, voice is totally muted during information-bearing data transmission and its attendant ACK sequence. After the system has sent the information-bearing data, the communication link returns to the voice mode. The entire process of switching to information-bearing data transmission mode, the transmission of information-bearing data, the ACK message, and finally switching back to voice mode takes less than a half a second. An information-bearing data burst is supplied to the transmitter at regular intervals. Specifically, information-bearing data is transmitted after every one, five, or thirty seconds of voice transmnission. Such information-bearing data bursts sent during periods of muted voice do not unduly impair the voice communication for the 5 and 30 second modes. The one second update mode is used when no voice is needed, only position updates and status.

The Communication Protocol of the Present Invention

A detailed description of the communication link follows. This detailed description of the communication protocol of the present invention defines the frame content scheme and the data transfer logic scheme.

The Frame Content Scheme

The frame content scheme of the present communication protocol utilizes frames which are either Data Frames or Supervisory Frames.

Data Frames contain data such as location and event/condition/status information being transferred from the vehicle to the remotely located base station or data from the base station to the vehicle.

Supervisory frames contain protocol commands and/or acknowledgment messages. The basic frame structure is a shown in the table 1 which appears in FIG. 1. Note that all frames begin with a Start of Header ("SOH") byte and end with a 16 bit Cyclic Redundancy Check ("CRC") byte. The second character in the frame is the Frame Identifier. This character specifies the frame's function as denoted in the table which appears in FIG. 2.

Frame sequence numbers are MODULO 256 and are assigned to each frame in succession. The fourth character in the frame is the sequence number. The vehicle and monitoring station assign Byte Count and Sequence Numbers independently as frames are being transmitted. Supervisory frames are exactly 5 characters in length. An information frame may be anywhere from 7 to 256 characters in length and it may contain 1 to 250 data characters. The last data character in an information frame is followed by a 16 bit Cyclic Redundancy Check byte.

The Data Transfer Logic Scheme

The data transfer protocol for the communication link of the present invention between a vehicle and a monitoring station is half duplex. This means that only one unit may transmit at any one time. The modem data receiver is always listening for the information-bearing data sequence that signals the beginning of the information-bearing data stream. The data receiver can detect or respond to the data sequence signaling the presence of an information-bearing data field within 25 msec.

The details of the communication link will now be described. When the system in the vehicle wishes to communicate with the remote base station, a cellular call is placed from the vehicle to the base station. The call is placed over the cellular system and comes into the base station on the land-line Public Switched Telephone Network (PSTN). When the base station modem detects a ringing condition on the incoming telephone line, the base station computer attached to the modem commands the modem to go off hook (answer the call). The base station computer then mutes the voice audio and sends a greeting (invitation to transmit) command to the unit in the vehicle. The vehicle unit detects this greeting and responds with an ACK message message. This ACK message message tells the base station computer that the vehicle unit heard and understood the greeting command. The vehicle unit then begins sending information bearing packets of data at regular intervals to the base station. For each information bearing data packet received by the base station computer without errors, the base station sends an ACK message message back to the vehicle unit and increments the Sequence byte. In this way, both ends of the communication link know that they are still in contact with each other. Without this ACK message scheme the vehicle unit would not know if the link had been broken.

Location data frames are never retransmitted if an error occurs. In this system, lost or damaged data frames are of little consequence—as long as the condition does not persist. The GPS location information is renewed for every frame regardless of whether the previous frame was received correctly or its associated ACK message was correctly received by the remote unit. Hence, there is never a duplicate position data frame in this system. However, the Sequence byte may be repeated over one or more data frames if the frames are not getting through. The true purpose of the Sequence byte and the ACK message is not so much to maintain data integrity as it is to allow both the vehicle unit and the base station to be aware of the condition of the communication link. When the vehicle unit sends a data frame to the base station and receives an ACK, message the vehicle unit KNOWS that the base station correctly received the data frame. When the base station receives a data frame, the sequence byte should be advanced one count from the last received data frame. If it is, then the base station KNOWS that the vehicle unit received the base station's last ACK message. In this way, both ends KNOW that the other end is hearing the messages correctly in this half duplex system.

Failure at the vehicle unit to receive ACKs ACK messages could mean that either half of the communication link is not operating correctly. At the base station it is obvious when data frames are not being received correctly. Moreover, multiple data frames received at the base station with the same sequence byte indicate that the vehicle is not hearing the ACKs ACK message to its data frames. When communication link problems are encountered, this system allows the base station to determine in which direction the data link is failing.

If a specific time period elapses without the vehicle unit hearing a proper Acknowledgement (ACK) from the base station, the vehicle unit will terminate the communication link and place another call.

When a command is to be issued to the vehicle unit from the base station operator, the base station computer first waits for the next scheduled data packet from the vehicle unit. Then, instead of the base station computer sending an ACK message message to the vehicle unit, a command frame type message is sent. When the vehicle unit receives this command frame, the vehicle unit sends an ACK message frame to the base station. This scheme allows both ends of the link to know that the command got through correctly. Commands must get through and get through only once. If the command/ACK message sequence does not transpire correctly, then the command must be re-issued upon the next vehicle to base station data frame. This will continue until the message gets through. The Sequence Byte is used to indicate if the command got through.

If the communication link is initiated by the base station calling the vehicle, then the vehicle unit answers the call and begins sending information bearing data frames immediately without being invited to do so by the base station. Again, if the timeout occurs without the vehicle unit receiving a good Acknowledgment frame from the base station, then the communication link will be terminated but the vehicle unit will not place a call to the base station. The vehicle unit may have answered a call not from the base station.

The details of the frame timing and data recovery will now be described for a data frame. Before the actual transmission begins, the entire frame must be constructed, The data frame begins with a Start Of Header (SOH) byte followed by the Frame ID. The Frame ID describes what type of frame this one is. The length of the data field in the frame is defined by the Byte Count and is the third byte in the frame. The next byte in the frame is the Sequence Byte. This byte allows duplicate messages to be detected. The data field is the next set of bytes in the frame. All of the bytes in the frame from the SOH onward have been processed through the Cyclic Redundancy Checker algorithm. The result of this CRC generation is a two byte CRC. This completes the construction of the frame.

As shown in FIG. 3, the transmitting modem's data carrier requires up to 20 msec to stabilize before sending data. Once transmit carrier stabilization is achieved, a synchronizing data pattern known as a Preamble is sent. This Preamble consists of four bytes of 055H followed by four bytes of 0FFH. The purpose of this Preamble is to condition the receiver's data-clock separator allowing it to acquire first bit synchronization and then byte synchronization. The data frame is then sent. After the last Cyclic Redundancy Check character has been transmitted, a dummy character of 0FFH is sent to insure that the transmitter buffer is actually empty and to provide a smooth transition from data to no data at the receiver. This helps flush out the last character at the transmitter. After this last byte has been transmitted, the transmitter's carrier is turned off and its receiver is enabled awaiting an ACK message from the other modem. Audio muting is left on.

When the base station sees that a data frame has begun, the base station mutes the voice audio to prevent data corruption. The way the base station computer "sees" that a message has begun is by first seeing the SOH character followed by a valid Frame ID. The byte count is also used to further qualify the incoming message. If all three bytes appear to be reasonable (a combination recognized by the base station), then a valid message is assumed to be coming in and muting is applied and the rest of the message is received. The base station computer then assembles the incoming frame. After the last Cyclic Redundancy Check byte is received at the base station, the receiving base station computer calculates and verifies the received frame's CRC bytes. If the CRC verifies, then the receiving modem turns on its transmit carrier and allows it to stabilize for 20 ms, sends the preamble, and then sends an ACK message frame.

All data frames and command frames are acknowledged immediately upon their reception. If the transmitter does not receive an Acknowledgment message within a specified time period, then the transmitter assumes that one is not coming or either the data or the ACK message frame was corrupted. The data frame is not retransmitted and the Sequence number is NOT incremented. This is used as an indication to the base station that the last message did not complete correctly. Information-bearing data frames from the tracking module on the vehicle are transmitted with freshened or renewed GPS data at the selected update rate of one, five, or thirty seconds. Therefore, as described above, if a location/status message was corrupted and did not complete correctly, then it is not retransmitted but rather simply updated at the next selected time.

Command frames must get through once and only once. If the base station sends a command to the vehicle tracker unit and an ACK message is not received with the associated Sequence number correct, then, at the next opportunity, a duplicate command (with the same Sequence number as the last frame) will be sent out again. This will continue at every transmission opportunity until the command gets through and the base station KNOWS that it got through. The Sequence byte is used, as described above, to insure that both ends KNOW that the frame completed correctly. Data frames which are not location/status data but rather other important data such as a position history log must also get through once and only once. These types of data frames, which can go either direction, must follow the same rules as the command frames just described.

The modes of operation of the communication system of the present invention are as follows.

Voice with information-bearing data at 1, 5, or 30 second intervals with audio enabled.

Information-bearing data at 1, 5, or 30 second intervals with the loudspeaker audio to the cellular phone handset disabled or muted (eavesdrop mode).

In the voice with information-bearing data mode, information-bearing data is sent in approximately 200 msec bursts. This time period is followed by the transit time to the base station which is variable depending on the route taken by the transmission. The time for the ACK message is also included in the total time of muting. The overall time of muting is less than ½ second. Therefore, an interruption of this short duration to transmit information-bearing data and receive the reply is not overly disruptive to those speaking over the cellular communication link in the 5 and 30 second modes.

When the tracker unit first places a call during an event, the tracker enters the Eavesdrop mode. The eavesdrop mode is identical to the voice with information-bearing data mode except that the voice signal channel from the base station going to the vehicle speaker is muted. The cellular telephone microphone is enabled. This allows audio from within the vehicle to be heard at the base station. In the event of an intruder or an attack on the occupants of the vehicle, the actual voices will be transmitted to the base station. If desired, these voice signals can be conferenced into a law enforcement communication system. Because voice signals to the vehicle are disabled, the intruder or the attacker will not know that voice in the vehicle is being monitored. When it is desired to communicate with the occupants of the vehicle, a "Produce Simulated Ring" command is sent to the vehicle tracking unit. After the ring is generated, the audio path from the base station to the vehicle tracker is enabled and the occupants can hear the base station operator.

During diagnostic interrogation and other non-alarm/non-emergency situations the voice signal, both to and from the vehicle, is turned on.

The interval in which the vehicle transmits new position data is variable. The initial interval for this update is 1 second so as to get a good track of the position. However, voice communication is not feasible at this rate. To facilitate the eavesdrop mode to determine if a crisis is in process, the base station operator can issue a command to the tracking module to acquire and transmit information-bearing data at a slower rate, specifically at a 5 second interval. If voice communication is paramount with only occasional location updates, then the 30 second modem is best. A Data On Demand command can be sent at any time for an instant update.

A clearer understanding of the communication protocol of the present information may be had by a listing of the various types of transmitted information-bearing data, as follows.

Data from the monitoring station:
Mode change.
　Eavesdrop and full audio mode.
　Normal resolution position information resolution (5 sec)/high resolution position information resolution (1 sec).
　Reset/exit/abort per an alarm condition. (This mode is used when terminating a call if the condition that initiated the alarm still persists, that is the vehicle's battery is low/dead.)
　Deactivate. (This mode is used to turn off a system when there is a malfunction or when it is not desired that a unit be able to call the monitoring station.)
　Long/Short message format mode
　Mute/Unmute audio to vehicle speaker mode
　Define System Operation Parameters
Upload data.
　Time interval for vehicle service /logging call
　Location logging time interval
　Alternate telephone numbers.
Data from the vehicle:
GPS location data
Vehicle ID (A 32 bit binary data sequence)
Base station identification first call (used in the case of a lost line and reconnect to identify original base station handler)
Tracking module status—Current status.
　Alarm input
　Panic switch
　Ignition sense
　Ignition no passcode
　Dead battery
　Low battery
　Commanded event
Secondary status.
　Watchdog reset has occurred
　GPS receiver failure
　ROM CRC bad
　RAM CRC bad
　Ignition enabled/disabled.
Third status
　Current GPS status.
　Armed/unarmed.
　Audio muted/unmuted.
Fourth status—Cumulative status
　Panic switch.
　Alarm switch.
　Ignition.
　Motion no ignition.
　Dead battery.
　Low battery.
　Ignition.
　Commanded event.
GPS data.
　Universal coordinated time data.

Latitude data.
Longitude data.
GPS calculated ground speed in knots.
GPS calculated heading.
Date.

GPS data only.
Universal coordinated time.
Latitude.
Longitude.
GPS calculated ground speed.
GPS calculated heading in knots.

Auxiliary other status

While the present invention has been described in its preferred embodiment, it will be understood by those of ordinary skill in the art the other embodiments of the instant invention are possible once having read the foregoing disclosure. Such other embodiments shall be included within the scope and meaning of the appended claims.

What is claimed:

1. A method protocol for voice audio and data communication, said method protocol comprising the steps of:

initiating a cellular communication link from a first location to a second location by initiating a call from said first location to said second location;

completing said cellular communication link between said first location and said second location by receiving said call at said second location and muting a voice audio portion of said cellular communication link;

sending a greeting data burst in a first supervisory frame from said second location to said first location, said greeting data burst inviting said first location to transmit an information data burst in a data frame;

sending an acknowledgment data burst in a second supervisory frame from said first location to said second location;

sending at least one information data burst in a data frame from said first location to said second location;

sending an acknowledgment data burst in a third supervisory frame from said second location to said first location following the receipt of each data frame transmitted from said first location at said second location; and restoring the voice audio portion of said cellular communication link.

2. The method protocol as defined in claim 1 wherein each of said supervisory frames includes:

a start of header byte;
   a frame identifier byte;
   a sequence number byte; and
   at least one error detection byte.

3. The method protocol as defined in claim 1 wherein said data frame includes:

a start of header byte;
   a frame identifier byte;
   a byte count;
   a sequence number byte;
   data bytes; and
   at least one error detection byte.

4. The method protocol as defined in claim 3 wherein said byte count and sequence number byte include information describing:

an information packet number;
   the length of said information packet; and
   the location of said at least one error detection byte.

5. The method protocol as defined in claim 3 wherein said data bytes contain information describing a location, an event or a condition.

6. The method protocol as defined in claim 1 where the voice audio portion of said cellular communication link is restored if no data frames are properly transmitted from said first location to said second location in a pre-determined amount of time.

7. The method protocol as defined in claim 3 wherein said sequence number byte is incremented after the receipt of said acknowledgement data burst from said second location at said first location.

8. The method protocol as defined in claim 3 wherein the data contained in said sequence number byte is used at said second location to determine if said data frame is a re-transmission of a previously transmitted data frame or a heretofore previously untransmitted data frame.

9. The method protocol as defined in claim 1 wherein said at least one information data burst will be re-transmitted from said first location if an acknowledgement data burst from said second location is not received at said first location within a pre-determined amount of time.

10. The method protocol as defined in claim 5 wherein said at least one information data burst transmitted from said first location to said second location will contain more recent information describing in a location, an event, or a condition if an acknowledgement data burst from said second location is not received at said first location within a pre-determined amount of time.

11. A method protocol for inserting a data burst transmission into a cellular data/voice communications link, said method protocol comprising the steps of:

alerting a second location to a transmission of data bytes by sending a data frame from a first location to said second location which begins with:
   a start of header byte;
   a frame identifier byte; and
   a byte count;
   muting voice communication;
   sending a sequence number byte;
   sending said data bytes;
   sending at least one error detection byte;
   sending an acknowledgment data burst in a supervisory frame from said second location to said first location following the receipt of said data frame transmitted from said first location at said second location; and
   unmuting said voice communication after said supervisory frame has been received at said first location.

12. The method protocol as defined in claim 11 wherein said supervisory frame includes:

a start of header byte;
   a frame identifier byte;
   a sequence number byte; and
   at least one error detection byte.

13. The method protocol as defined in claim 11 wherein said byte count and sequence number byte include information describing:

an information packet number;
   the length of said information packet; and
   the location of said at least one error detection byte.

14. The method protocol as defined in claim 11 wherein said data bytes contain information describing a location, an event, or a condition.

15. The method protocol as defined in claim 11 wherein the voice communication of said cellular data/voice communications link is restored if no data frames are properly transmitted from said first location to said second location in a predetermined amount of time.

16. The method protocol as defined in claim 11 wherein said sequence number byte is incremented after the receipt of said acknowledgement data burst from said second location at said first location.

17. The method protocol as defined in claim 16 wherein the data contained in said sequence number byte is used at said second location to determine if said data frame is a re-transmission of a previously transmitted data frame or a heretofore previously untransmitted data frame.

18. The method protocol as defined in claim 11 wherein said at least one information data burst will be re-transmitted from said first location to said second location if an acknowledgement data burst from said second location is not received at said first location within a pre-determined amount of time.

19. The method protocol as defined in claim 14 wherein said at least one information data burst transmitted from said first location will contain more recent information describing a location, an event or a condition if an acknowledgement data burst from said second location is not received at said first location within a predetermined amount of time.

20. The method protocol as defined in claim 11 wherein said transmission of data bytes from said first location to said second location occurs at regular time intervals.

21. A method protocol for data communication, said method protocol comprising the steps of:
   initiating a cellular communication link having voice audio to a first location from a second location by initiating a call from said second location to said first location;
   completing said cellular communication link between said first location and said second location;
   muting the voice audio;
   sending at least one information data burst in a data frame from said first location to said second location;
   transmitting at least one error detection byte from said first location to said second location; and
   sending an acknowledgment data burst in a supervisory frame from said second location to said first location following the receipt of said data frame transmitted from said first location to said second location.

22. The method protocol for data communication as defined in claim 21 wherein said data frame includes:
   a start of header byte;
   a frame identifier byte;
   a byte count; and
   a sequence number byte.

23. The method protocol as defined in claim 21 wherein said supervisory frame includes:
   a start of header byte;
   a frame identifier byte;
   a sequence number byte; and
   at least one error detection byte.

24. The method protocol as defined in claim 22 wherein said byte count and said sequence number byte include information describing:
   an information packet number;
   the length of said information packet; and
   the location of said at least one error detection byte.

25. The method protocol as defined in claim 21 wherein said data bytes contain information describing a location, an event or a condition.

26. The method protocol as defined in claim 22 wherein said sequence number byte is incremented after the receipt of said acknowledgment data burst from said second location at said first location.

27. The method protocol as defined in claim 26 wherein the data contained in said sequence number byte is used at said second location to determine if said data frame is a re-transmission of a previously transmitted data frame or a heretofore previously untransmitted data frame.

28. The method protocol as defined in claim 21 wherein said at least one information data burst will be re-transmitted from said first location if an acknowledgement data burst from said second location is not received at said first location within a predetermined amount of time.

29. The method protocol as defined in claim 25 wherein said at least one information data burst transmitted from said first location will contain more recent information describing a location, an event or a condition if an acknowledgement data burst from said second location is not received at said first location within a predetermined amount of time.

30. The method protocol as defined in claim 1 wherein said first location is a vehicle and said second location is a response center.

31. The method protocol as defined in claim 11 wherein said first location is a vehicle and said second location is a response center.

32. The method protocol as defined in claim 21 wherein said first location is a vehicle and second location is a response center.

33. The messages produced according to the method protocol as defined in claim 1.

34. The messages produced according to the method protocol as defined in claim 11.

35. The messages produced according to the method protocol as defined in claim 21.

36. A method protocol for voice audio and data communication, said method protocol comprising the steps of:
   initiating a cellular communication link from a first location to a second location by initiating a call from said first location to said second location;
   completing said cellular communication link between said first location and said second location by receiving said call at said second location and muting a voice audio portion of said cellular communication link at said second location;
   sending a greeting data burst in a first supervisory frame from said second location to said first location, said greeting data burst inviting said first location to transmit an information data burst in a data frame; and
   restoring the voice audio portion of said cellular communication link after said data frame has been transmitted from said first location and received at said second location.

37. The method protocol as defined in claim 36 further comprising the step of sending an acknowledgment data burst in a third supervisory frame from said second location to said first location following the receipt of each data frame transmitted from said first location at said second location.

38. The method protocol as defined in claim 37 wherein a subsequent information data burst transmitted from said first location to said second location will contain more recent information describing a location, an event, or a condition if said acknowledgment data burst transmitted from said second location is not received at said first location within a pre-determined amount of time after said first location responds to said greeting data burst by sending said data frame to said second location.

39. A method protocol for voice audio and data communication, said method protocol comprising the steps of:

initiating a cellular communication link to a first location from a second location by initiating a call from said second location to said first location;

completing said cellular communication link between said first location and said second location by receiving said call at said first location and muting a voice audio portion of said cellular communication link at said second location;

sending a greeting data burst in a first supervisory frame from said second location to said first location, said greeting data burst inviting said first location to transmit an information data burst in a data frame; and restoring the voice audio portion of said cellular communication link after said data frame has been transmitted from said first location and received at said second location.

40. The method protocol as defined in claim 39 further comprising the step of sending an acknowledgment data burst in a third supervisory frame from said second location to said first location following the receipt of each data frame transmitted from said first location at said second location.

41. The method protocol as defined in claim 40 wherein a subsequent information data burst transmitted from said first location to said second location will contain more recent information describing a location, an event, or a condition if said acknowledgment data burst transmitted from said second location is not received at said first location within a pre-determined amount of time after said first location responds to said greeting data burst by sending said data frame to said second location.

* * * * *

UNITED STATES PATENT AND TRADEMARK OFFICE
CERTIFICATE OF CORRECTION

PATENT NO. : 6,011,806
DATED : January 4, 2000
INVENTOR(S) : Russell M. Herring

It is certified that error appears in the above-identified patent and that said Letters Patent is hereby corrected as shown below:

Drawings,

Sheet 2 of 3 (Fig. 2), Column 1, Row 5,
After the word "Acknowledgment", delete "(ADK)" and substitute -- (ACK) -- therefor.

Column 7,
Line 41, after the word "receive", delete "ACKs".
Line 47, after the word "the", delete "ACKs".

Signed and Sealed this

Ninth Day of October, 2001

Attest:

NICHOLAS P. GODICI
Attesting Officer
Acting Director of the United States Patent and Trademark Office

UNITED STATES PATENT AND TRADEMARK OFFICE
CERTIFICATE OF CORRECTION

PATENT NO. : 6,011,806
DATED : January 4, 2000
INVENTOR(S) : Russell M. Herring

It is certified that error appears in the above-identified patent and that said Letters Patent is hereby corrected as shown below:

<u>Column 7,</u>
Line 6, after the first occurrence of the word "message", delete the word "message".
Line 7, after the first occurrence of the word "message", delete the word "message".
Line 13, after the first occurrence of the word "message", delete the word "message".
Line 52, after "(ACK)", insert the word "message".
Line 59, after the first occurrence of the word "message", delete the word "message".

Signed and Sealed this

Thirteenth Day of November, 2001

*Attest:*

*Attesting Officer*

NICHOLAS P. GODICI
*Acting Director of the United States Patent and Trademark Office*